(12) United States Patent
Fay

(10) Patent No.: US 11,025,421 B2
(45) Date of Patent: Jun. 1, 2021

(54) ADVANCED MODULAR HANDSHAKE FOR KEY AGREEMENT AND OPTIONAL AUTHENTICATION

(71) Applicant: NXP B.V., Eindhoven (NL)

(72) Inventor: Bjorn Fay, Brande-Hornerkirchen (DE)

(73) Assignee: NXP B.V., Eindhoven (NL)

( * ) Notice: Subject to any disclaimer, the term of this patent is extended or adjusted under 35 U.S.C. 154(b) by 270 days.

(21) Appl. No.: 16/396,357

(22) Filed: Apr. 26, 2019

(65) Prior Publication Data

US 2020/0344052 A1 Oct. 29, 2020

(51) Int. Cl.
*H04L 29/06* (2006.01)
*H04L 9/08* (2006.01)
*H04L 9/00* (2006.01)

(52) U.S. Cl.
CPC .......... *H04L 9/0869* (2013.01); *H04L 9/006* (2013.01); *H04L 9/0863* (2013.01)

(58) Field of Classification Search
None
See application file for complete search history.

(56) References Cited

U.S. PATENT DOCUMENTS

| | | | |
|---|---|---|---|
| 7,694,141 B2 | 4/2010 | Lauter et al. | |
| 10,454,674 B1* | 10/2019 | Bar-El | H04L 9/0637 |
| 10,721,064 B2 | 7/2020 | Fay | |
| 2005/0251680 A1* | 11/2005 | Brown | H04L 9/08 713/171 |
| 2012/0011360 A1* | 1/2012 | Engels | H04L 9/083 713/166 |
| 2019/0372759 A1* | 12/2019 | Rix | H04L 9/0844 |

OTHER PUBLICATIONS

Hedayati, Maysam et al. Using identity-based secret public keys cryptography for heuristic security analyses in grid computing. https://ieeexplore.IEEE.org/stamp/stamp.jsp?tp=&arnumber=5734028 (Year: 2010).*

Chi-Chih Yao, Andrew; Zhao, Yunlei. Privacy-Preserving Authenticated Key-Exchange Over Internet. IEEE Transactions on Information Forensics and Security, vol. 9, Issue: 1. https://ieeexplore.IEEE.org/stamp/stamp.jsp?tp=&arnumber=6678243 (Year: 2013).*

(Continued)

*Primary Examiner* — Jeremiah L Avery

(57) ABSTRACT

Various embodiments relate to a key protocol exchange that provide a simple but still secure key exchange protocol. Security of key exchange protocols has many aspects; providing and proving all these properties gets harder with more complex protocols. These security properties may include: perfect forward secrecy; forward deniability; key compromise impersonation resistance; security against unknown key share attack; explicit or implicit authentication; key confirmation; protocol is (session-)key independent; key separation (different keys for encryption and MACing); extendable, e.g., against DOS attacks; support of early messages; small communication footprint; and support of for public-key and/or password authentication.

24 Claims, 1 Drawing Sheet

(56) References Cited

OTHER PUBLICATIONS

Padmavathy, R.; Bhagvati, Chakravarthy. Methods to Solve Discrete Logarithm Problem for Ephemeral Keys. 2009 International Conference on Advances in Recent Technologies in Communication and Computing, https://ieeexplore.ieee.org/stamp/stamp.jsp?tp=&arnumber=5328917 (Year: 2009).*

Tedeschi, Pietro et al. When Blockchain Makes Ephemeral Keys Authentic: A Novel Key Agreement Mechanism in the IoT World. 2018 IEEE Globecom Workshops (GC Wkshps). https://ieeexplore.ieee.org/stamp/stamp.jsp?tp=&arnumber=8644494 (Year: 2018).*

Andrew Chi-Chih Yao and Yunlei Zhao: Privacy-Preserving Authenticated Key-Exchange Over Internet, IEEE Transactions on Information Forensics and Security, vol. 9, No. 1, January 2014, pp. 125-139.

J. Iyengar, Ed., et al. "QUIC: A UDP-Based Multiplexed and Secure Transport draft-ietf-quic-transport-19" Internet-Draft QUIC Transport Protocol Mar. 2019, 139 pages.

Triple Diffie-Hellman (ECC compatible). Any attacks against it?, (https://groups.google.com/forum/#!topic/sci.crypt/ZhR98p3fpXk), 2 pages. Aug. 18, 2002.

* cited by examiner

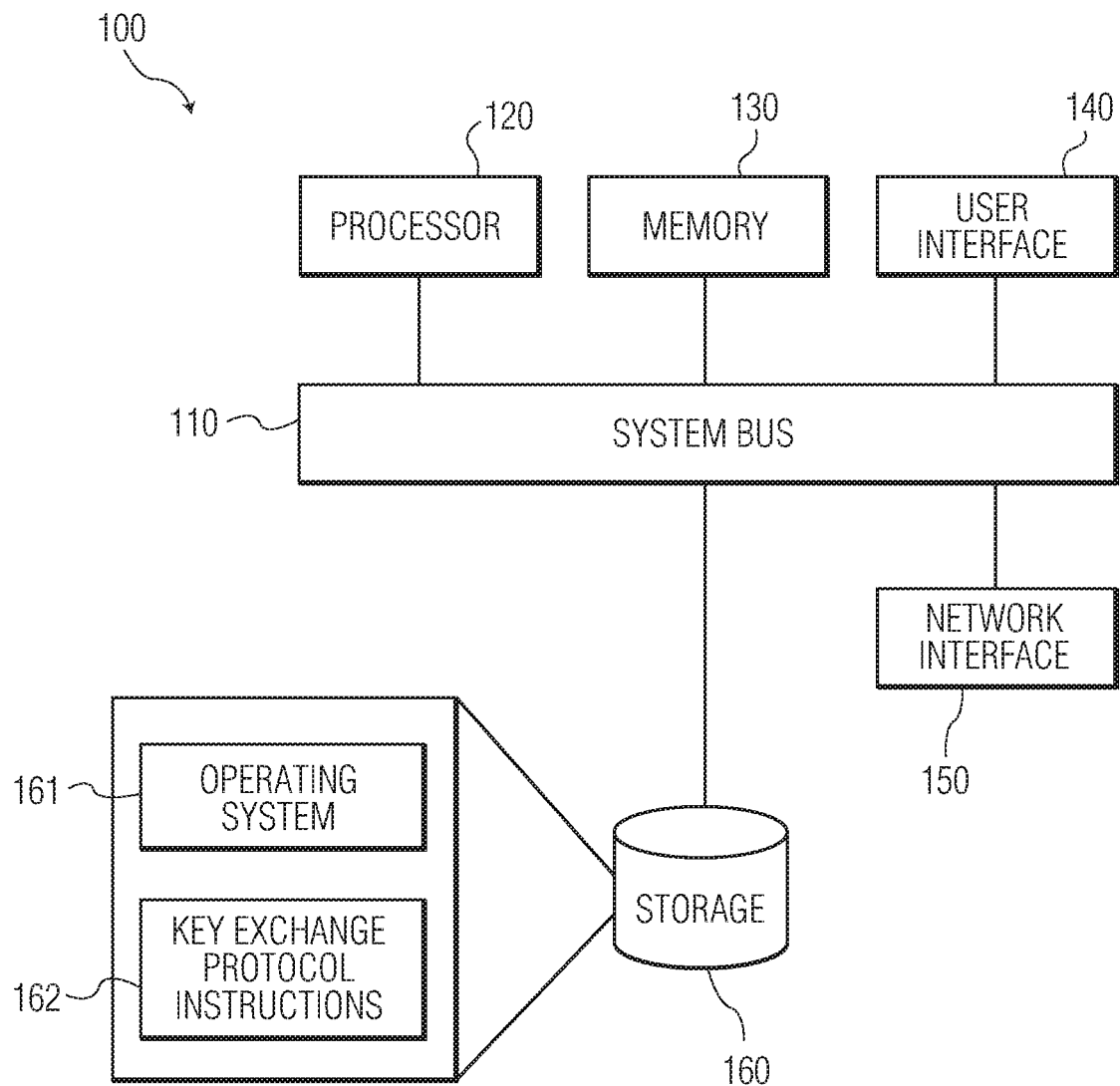

ADVANCED MODULAR HANDSHAKE FOR KEY AGREEMENT AND OPTIONAL AUTHENTICATION

TECHNICAL FIELD

Various exemplary embodiments disclosed herein relate generally to an advanced modular handshake for key agreement and optional authentication.

BACKGROUND

Various key exchange protocols have been developed to facilitate a key exchange for secure commutations. For example, these protocols may use the protocol to determine and share a common symmetric cryptographic key to be used for secure communication between two parties. Further, authentication of the parties may be a part of such a protocol to prevent attackers from gaining access to the secure communications.

SUMMARY

A summary of various exemplary embodiments is presented below. Some simplifications and omissions may be made in the following summary, which is intended to highlight and introduce some aspects of the various exemplary embodiments, but not to limit the scope of the invention. Detailed descriptions of an exemplary embodiment adequate to allow those of ordinary skill in the art to make and use the inventive concepts will follow in later sections.

Various embodiments relate to a method of generating a shared secret by a first party A between the first party A and a second party B, including: randomly generating an ephemeral private key $r \in \mathbb{Z}_n$, where n is the size of a group $\mathbb{G}$; computing an ephemeral public key $R = r \cdot G$ based upon the ephemeral private key r and a generator G of the group $\mathbb{G}$; transmitting to the second party the ephemeral public key R; receiving from the second party an ephemeral public key S and a check value cB, wherein the check value cB is based upon an ephemeral private key s, the corresponding ephemeral public key $S = s \cdot G$ and the ephemeral public key R; checking that the ephemeral public key S is an element of the group $\mathbb{G}$; computing an ephemeral shared secret $Z' = r \cdot S$ based upon the ephemeral private key r and the ephemeral public key S; computing a shared secret Z based upon the ephemeral shared secret Z', the ephemeral public key R and the ephemeral public key S; computing a key K based upon the shared secret Z; computing a new value for the shared secret Z based upon a one-way function applied to the shared secret Z; checking the check value cB; computing a second check value cA based upon the ephemeral public key R, the ephemeral public key S and the key K; and sending the second check value cA and an encrypted first message using the key K to the second party.

Various embodiments are described, further including: computing a semi-static shared secret $R' = r \cdot Y$ based upon the ephemeral private key r and the second party's public key Y; and wherein the check value cB is based upon an ephemeral private key s, the corresponding ephemeral public key S and the ephemeral public key R as well as the second party's public key $Y = y \cdot G$ and the second party's private key y; and wherein computing the shared secret Z based upon the ephemeral shared secret Z', the ephemeral public key R and the ephemeral public key S is further based upon the semi-static shared secret R' and the second party's public key Y.

Various embodiments are described, wherein: computing the shared secret Z based upon the ephemeral shared secret Z', the ephemeral public key R, the ephemeral public key S, the semi-static shared secret R' and the second party's public key Y is done by hashing the ephemeral shared secret Z', the semi-static shared secret R', the ephemeral public key R, the ephemeral public key S and the second party's public key Y; computing a key K based upon the shared secret Z is done by hashing a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Various embodiments are described, further including: computing a semi-static shared secret S' based upon the first party's private key x and the ephemeral public key S by computing $S' = (x-r) \cdot S + Z'$; and wherein the check value cB is based upon an ephemeral private key s, the corresponding ephemeral public key S, the ephemeral public key R, the second party's public key Y and the second party's private key y as well as the first party's public key X; and wherein computing the shared secret Z based upon the ephemeral shared secret Z', the ephemeral public key R, the ephemeral public key S, the semi-static shared secret R' and the second party's public key Y is further based upon the semi-static shared secret S' and the first party's public key X.

Various embodiments are described, wherein: computing the shared secret Z based upon the ephemeral shared secret Z', the ephemeral public key R, the ephemeral public key S, the semi-static shared secret R', the second party's public key Y, the semi-static shared secret S' and the first party's public key X is done by hashing the ephemeral shared secret Z', the semi-static shared secret R', the semi-static shared secret S', the ephemeral public key R, the ephemeral public key S, the first party's public key X and the second party's public key Y; computing a key K based upon the shared secret Z is done by hashing a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Various embodiments are described, further including: computing a key W based upon the shared secret Z', the semi-static shared secret R', the ephemeral public key R, the ephemeral public key S and the second party's public key Y; computing a semi-static shared secret $\check{S} = \pi \cdot S$ based upon a value $\pi \in \mathbb{Z}_n$ that depends on a password w of the first party, and the ephemeral public key S by computing $\check{S} = (\pi - r) \cdot S + Z'$; encrypting an identifier id_Q for the password's public key $Q = \pi \cdot G$ or encrypting a certificate $Cert_B(Q)$ for the password's public key Q issued by the second party B, using the key W; and sending the encrypted identifier id_Q or the encrypted certificate $Cert_B(Q)$ to the second party; wherein the check value cB is based upon the key W, the ephemeral public key R and the ephemeral public key S, and wherein computing the shared secret Z based upon the ephemeral shared secret Z', the ephemeral public key R, the ephemeral public key S, the semi-static shared secret R' and the second party's public key Y is further based upon the semi-static shared secret $\tilde{S}$.

Various embodiments are described, wherein: computing a key W based upon the shared secret Z', the semi-static shared secret R', the ephemeral public key R, the ephemeral public key S and the second party's public key Y is done by hashing the shared secret Z', the semi-static shared secret R', the ephemeral public key R, the ephemeral public key S and the second party's public key Y; and computing the shared secret Z based upon the ephemeral shared secret Z', the ephemeral public key R, the ephemeral public key S, the semi-static shared secret R', the second party's public key Y and the semi-static shared secret $\tilde{S}$ is done by hashing the ephemeral shared secret Z', the semi-static shared secret R', the semi-static shared secret $\tilde{S}$, the ephemeral public key R, the ephemeral public key S and the second party's public key Y; computing a key K based upon the shared secret Z is done by hashing a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Various embodiments are described, wherein the generator G is replaced by a password dependent generator $G_\pi = G + \pi \cdot G'$ where the value $\pi \in \mathbb{Z}_n$ depends on a password w and G' is another generator of the group $\mathbb{G}$.

Various embodiments are described, wherein: computing a shared secret Z based upon the ephemeral shared secret Z', the ephemeral public key R and the ephemeral public key S is done by hashing the ephemeral shared secret Z', the ephemeral public key R and the ephemeral public key S; computing a key K based upon the shared secret Z is done by hashing the a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Various embodiments are described, further including: computing a semi-static shared secret $\tilde{S}$ based upon the value $\pi$ and the ephemeral public key S by computing $\tilde{S} = (\pi - r) \cdot S + Z'$; and wherein computing the shared secret Z based upon the ephemeral shared secret Z', the ephemeral public key R and the ephemeral public key S is further based upon the semi-static shared secret $\tilde{S}$.

Various embodiments are described, wherein: computing the shared secret Z based upon the ephemeral shared secret Z', the ephemeral public key R, the ephemeral public key S and the semi-static shared secret $\tilde{S}$ is done by hashing the ephemeral shared secret Z', the ephemeral public key R, the ephemeral public key S and the semi-static shared secret $\tilde{S}$; computing a key K based upon the shared secret Z is done by hashing a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Various embodiments are described, wherein: computing a shared secret Z based upon the ephemeral shared secret Z', the ephemeral public key R and the ephemeral public key S is done by hashing the ephemeral shared secret Z', the ephemeral public key R and the ephemeral public key S; computing a key K based upon the shared secret Z is done by hashing a first constant value followed by the shared secret Z; computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

Further various embodiments relate to a method of generating a shared secret by a second party B between a first party A and the second party B, including: randomly generating an ephemeral private key $s \in \mathbb{Z}_n$, where n is the size of a group $\mathbb{G}$; computing an ephemeral public key $S = s \cdot G$ based upon the ephemeral private key s and a generator G of the group $\mathbb{G}$; receiving from the first party an ephemeral public key R; checking that the ephemeral public key R is an element of the group $\mathbb{G}$; computing an ephemeral shared secret $Z' = s \cdot R$ based upon the ephemeral private key s and the ephemeral public key R; computing a shared secret Z based upon the ephemeral shared secret Z', the ephemeral public key R and the ephemeral public key S; computing a key K based upon the shared secret Z; computing a new value for the shared secret Z based upon a one-way function applied to the shared secret Z; compute a check value cB based upon the key K, the ephemeral public key R and the ephemeral public key S; sending to the first party the ephemeral public key S and the check value cB; receiving a second check value cA and an encrypted first message from the first party, wherein the check value cA is based upon the key K, the ephemeral public key R and the ephemeral public key S and the first message is encrypted using the key K; and checking the check value cA.

Various embodiments are described, further including: computing a semi-static shared secret R' based upon the second party's private key y and the ephemeral public key R by computing $R' = (y - s) \cdot R + Z'$; and wherein computing the shared secret Z based upon the ephemeral shared secret Z', the ephemeral public key R and the ephemeral public key S is further based upon the semi-static shared secret R' and the second party's public key Y.

Various embodiments are described, further including: computing a semi-static shared secret $S' = s \cdot X$ based upon the ephemeral private key s and the first party's public key X; and wherein computing the shared secret Z based upon the ephemeral shared secret Z', the ephemeral public key R, the ephemeral public key S, the semi-static shared secret R' and the second party's public key Y is further based upon the semi-static shared secret S' and the first party's public key X.

Various embodiments are described, wherein: computing the shared secret Z based upon the ephemeral shared secret Z', the ephemeral public key R, the ephemeral public key S, the semi-static shared secret R', the second party's public key Y, the semi-static shared secret S' and the first party's public key X is done by hashing the ephemeral shared secret Z', the semi-static shared secret R', the semi-static shared secret S', the ephemeral public key R, the ephemeral public key S, the first party's public key X and the second party's public key Y; computing a key K based upon the shared secret Z is done by hashing a first constant value followed by the shared secret Z; computing a new value for the shared secret Z based upon the shared secret Z is done by hashing a second constant value followed by the shared secret Z; and compute a check value cB based upon the key K, the ephemeral public key R and the ephemeral public key S is done by computing a MAC over a third constant value, the ephemeral public key R, the ephemeral public key S using the key K.

Various embodiments are described, further including: computing a key W based upon the shared secret Z', the semi-static shared secret R', the ephemeral public key R, the ephemeral public key S and the second party's public key Y; receiving from the first party an encrypted identifier id_Q or an encrypted certificate $Cert_B(Q)$, issued by the second party B, wherein $Q=\pi \cdot G$ is the password's public key and $\pi \in \mathbb{Z}_n$ is a value, that depends on the first party's password w; decrypting the identifier id_Q or the certificate $Cert_B(Q)$ using the key W and obtain the valid password's public key Q; computing a semi-static shared secret $\tilde{S}=s \cdot Q$ based upon the ephemeral private key S and the password's public key Q; and wherein compute a check value cB based upon the key K, the ephemeral public key R and the ephemeral public key S is based upon the key W instead of the key K; and wherein computing the shared secret Z based upon the ephemeral shared secret Z', the ephemeral public key R, the ephemeral public key S, the semi-static shared secret R' and the second party's public key Y is further based upon the semi-static shared secret $\tilde{S}$.

Various embodiments are described, wherein: computing a key W based upon the shared secret Z', the semi-static shared secret R', the ephemeral public key R, the ephemeral public key S and the second party's public key Y is done by hashing the shared secret Z', the semi-static shared secret R', the ephemeral public key R, the ephemeral public key S and the second party's public key Y; computing the shared secret Z based upon the ephemeral shared secret Z', the ephemeral public key R, the ephemeral public key S, the semi-static shared secret R', the second party's public key Y and the semi-static shared secret $\tilde{S}$ is done by hashing the ephemeral shared secret Z', the semi-static shared secret R', the semi-static shared secret $\tilde{S}$, the ephemeral public key R, the ephemeral public key S and the second party's public key Y; computing a key K based upon the shared secret Z is done by hashing a first constant value followed by the shared secret Z; computing a new value for the shared secret Z based upon the shared secret Z is done by hashing a second constant value followed by the shared secret Z; and compute a check value cB based upon the key W, the ephemeral public key R and the ephemeral public key S is done by computing a MAC over a third constant value, the ephemeral public key R, the ephemeral public key S using the key W.

Various embodiments are described, wherein the generator G is replaced by a password dependent generator $G_\pi=G+\pi \cdot G'$ where the value $\pi \in \mathbb{Z}_n$ depends on a password w and G' is another generator of the group $\mathbb{G}$.

Various embodiments are described, wherein: computing a shared secret Z based upon the ephemeral shared secret Z', the ephemeral public key R and the ephemeral public key S is done by hashing the ephemeral shared secret Z', the ephemeral public key R and the ephemeral public key S; computing a key K based upon the shared secret Z is done by hashing a first constant value followed by the shared secret Z; computing a new value for the shared secret Z based upon the shared secret Z is done by hashing a second constant value followed by the shared secret Z; and compute a check value cB based upon the key K, the ephemeral public key R and the ephemeral public key S is done by computing a MAC over a third constant value, the ephemeral public key R, the ephemeral public key S using the key K.

Various embodiments are described, further including: computing a semi-static shared secret $\tilde{S}=s \cdot Q_\pi$ based upon the ephemeral private key s and the password's public key $Q_\pi=\pi \cdot G_\pi$; and wherein computing the shared secret Z based upon the ephemeral shared secret Z', the ephemeral public key R and the ephemeral public key S is further based upon the semi-static shared secret S.

Various embodiments are described, wherein: computing the shared secret Z based upon the ephemeral shared secret Z', the ephemeral public key R, the ephemeral public key S and the semi-static shared secret $\tilde{S}$ is done by hashing the ephemeral shared secret Z', the semi-static shared secret $\tilde{S}$, the ephemeral public key R, the ephemeral public key S; computing a key K based upon the shared secret Z is done by hashing a first constant value followed by the shared secret Z; computing a new value for the shared secret Z based upon the shared secret Z is done by hashing a second constant value followed by the shared secret Z; and compute a check value cB based upon the key K, the ephemeral public key R and the ephemeral public key S is done by computing a MAC over a third constant value, the ephemeral public key R, the ephemeral public key S using the key K.

Various embodiments are described, wherein: computing a shared secret Z based upon the ephemeral shared secret Z', the ephemeral public key R and the ephemeral public key S is done by hashing the ephemeral shared secret Z', the ephemeral public key R and the ephemeral public key S; computing a key K based upon the shared secret Z is done by hashing a first constant value followed by the shared secret Z; computing a new value for the shared secret Z based upon the shared secret Z is done by hashing a second constant value followed by the shared secret Z; and compute a check value cB based upon the key K, the ephemeral public key R and the ephemeral public key S is done by computing a MAC over a third constant value, the ephemeral public key R, the ephemeral public key S using the key K.

Various embodiments are described, wherein: computing the shared secret Z based upon the ephemeral shared secret Z', the ephemeral public key R, the ephemeral public key S, the semi-static shared secret R' and the second party's public key Y is done by hashing the ephemeral shared secret Z', the semi-static shared secret R', the ephemeral public key R, the ephemeral public key S and the second party's public key Y; computing a key K based upon the shared secret Z is done by hashing a first constant value followed by the shared secret Z; computing a new value for the shared secret Z based upon the shared secret Z is done by hashing a first constant value followed by the shared secret Z; and compute a check value cB based upon the key K, the ephemeral public key R and the ephemeral public key S is done by computing a MAC over a third constant value, the ephemeral public key R, the ephemeral public key S using the key K.

BRIEF DESCRIPTION OF THE DRAWINGS

In order to better understand various exemplary embodiments, reference is made to the accompanying drawings, wherein:

FIG. 1 illustrates an exemplary hardware diagram 100 for implementing a key exchange protocol according to the embodiments described above.

To facilitate understanding, identical reference numerals have been used to designate elements having substantially the same or similar structure and/or substantially the same or similar function.

DETAILED DESCRIPTION

The description and drawings illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments.

Many key exchange protocols are either very complicated or not (fully) secure, and in some cases both, e.g., TLS, IKF, SKEME, simple DH, STS, etc. The embodiments described herein provide a simple but still secure key exchange protocol. Security of key exchange protocols has many aspects; providing and proving all these properties gets harder with more complex protocols. These security properties may include: perfect forward secrecy; forward deniability; key compromise impersonation resistance; security against unknown key share attack; explicit authentication; key confirmation; (session-)key independence key separation (different keys for encryption and MACing); extendibility e.g., against DOS attacks . . . (e.g., using cookies, . . . ); support of early messages; small communication footprint; support of public-key and/or password authentication, different security/performance trade-offs for authentication by password; and implicit side-channel protection.

The embodiments of key exchange protocols described herein has a similar communication footprint as a normal Diffie-Hellman key exchange (DH-KF) in its secret sharing phase but performs additional computations on each side. It combines an ephemeral key exchange with two semi-static key exchanges. Afterwards, these key exchange embodiments check to determine if the key exchange was correctly executed by using an explicit authentication and implied key confirmation. On top of this or instead, a password authentication can also be used in using two different methods. Every variant of the protocol only uses three steps or messages that get sent around, which could also include some so-called early messages, which have a security level between plain messages before the handshake and secured messages after the handshake. Several multiplications are needed to carry out the key exchange protocol that may be optimized by using pre-computation for the same bases. The usage of the private key(s) and the passwords are already protected against side-channel attacks by design. The embodiments described herein provide a technological advancement in security by improving various security properties as described above.

Various embodiments of a key exchange protocol will now be described. In various situations two parties Alice (A) and Bob (B) want to communicate with each other using a communication link such as the internet. Alice and Bob want the communications to be confidential and to verify the authenticity of the communications from the other party. Authenticity means that one party is sure that it really communicates with the other party, that the messages are really coming from this other party, and that the messages have not been changed during transit (this last property is also called integrity). Confidentiality means that nobody else knows the content of the messages sent between the parties. There are even more properties that may be desired, but these two are the main properties usually desired.

To establish such a secure communication channel there are different possibilities, depending on the infrastructure that is available to Alice and Bob. In most cases this will be a public key infrastructure (PKI) or they already have set up a password. In the first case (PKI) one or both parties have a private/public key pair and in many cases also some certificate (Cert) of their public key, signed by a trusted third party (TTP), such that everybody who also trusts the TTP is assured that a certified public key belongs to the corresponding party, which is also included in the certificate. For Alice, the private key is x, and the public key is X. For Bob, the private key is y, and the public key is Y. For public key algorithms, the fundamental building blocks are usually based on one or more mathematical groups $\mathbb{G}$, such as $\mathbb{Z}_p$ the ring of integers modulo a prime p (or a multiplicative subgroup of it) or a prime order subgroup of an elliptic curve $E(\mathbb{F}_z)$ over some field $\mathbb{F}_q$ with q either prime or a power of two. There are also other groups possible, but these are the most common ones used. Such groups usually have a generator G, such that all group elements can be uniquely represented as i·G with some integer i smaller than the group order $n=|\mathbb{G}|=|\langle G \rangle|$ (size of the group).

Other building blocks may include symmetric encryptions $ENC_k$ with some key k, e.g., AES, together with the corresponding symmetric decryption $DEC_k$, message authentication codes $MAC_k$ with a key k, e.g., CMAC, and hash functions h, e.g., SHA-256. Sometimes encryption and authentication is combined into one single building block and is called authenticated encryption. For example, the following is an example of authenticated encryption: $AE_K(m)=ENC_k(m)||MAC_{k'}(ENC_k(m))$, where K=k||k' and "||" means the concatenation of two bit-strings. This construction is called Encrypt-then-MAC (EtM), but of course this may also be another authenticated encryption scheme if desired. For example, SHA3 may be used for hashing, MACing and AE, which would probably be most efficient.

To establish a secure channel normally a key exchange protocol is executed, such that after its execution the two parties agree on and share a common secret, which they use further to derive encryption and authentication keys to be used for ENC/DEC and MAC functions. In more advanced key exchange protocols, the parties may also have assurance of the other party's identity as well as the assurance that an attacker cannot prove that the two parties have communicated with each other; even one party cannot prove later that the other party was part of the communication (forward deniability). A further major property of such advanced key exchange protocols is the fact that if a long-term secret key is compromised, the security of previous established secure channels is still sound if the ephemeral keys are not compromised. This is called perfect forward secrecy. Various embodiments described below include the combination of a variety of steps that provide the properties that illustrated a technological advancement.

A very simple example of a key exchange protocol is the Diffie-Hellman key exchange (DH-KF), which is shown in Table 1 and is used in many protocols as a building block. But because there is no authentication included, DH-KF is vulnerable to so called man-in-the-middle attacks.

TABLE 1

DH Key Exchange

| Alice knows: $\mathbb{G}$, G, n | Communication | Bob knows: $\mathbb{G}$, G, n |
|---|---|---|
| $r \in_R \mathbb{Z}_n$ | | |
| $R = r \cdot G$ | | |
| | $R \rightarrow$ | |
| | | $s \in_R \mathbb{Z}_n$ |
| | | $S = s \cdot G$ |
| | $\leftarrow S$ | |
| $Z = r \cdot S$ | | $Z = s \cdot R$ |

Here $e \in_R M$ means taking a random element e from the set M according to a uniform distribution, such that each execution of the protocol uses different e's with very high probability. These various building blocks may be combined together into a key exchange protocol, such that the communication in the first phase may still be the same as (or very similar) as for the simple DH-KF, but provides more security and the possibility to add more features as well as drop some features (like authentication if not desired in some cases, like client server communication) in a very modular way. This approach means that the basis of the key exchange protocol is always the same, but some modules can be used or switched off as required by the actual use case.

Before the computation steps in the protocol are described, the usual PKI setup to enable the authentication by password needs to be extended. Normally the PKI only defines one generator G per group $\mathbb{G}$, but two "independent" generators are needed. In addition to the generator G, a second generator G' is also needed that has an unknown discrete logarithm to base G. One possible method to get this is simply by choosing G and G' by a pseudorandom function with a public seed, which could be for an elliptic curve with the first point on the curve with x-coordinate equal to the output of the pseudorandom function and smallest y-coordinate (or also randomized by the pseudorandom function) for this x-coordinate; this is iterated until a valid point is found. Depending on the co-factor, it may also be necessary to multiply this point by the co-factor to get into the right subgroup. The second point is then chosen in the same way with the following output of the pseudorandom function. For subgroups of $\mathbb{Z}_p$ the numbers would be a longer output of the pseudorandom function, reduced modulo p and multiplied by the co-factor (if given, this would normally be written as exponentiation).

The password w may be hashed (or a shared key might be used), and the password w or its hash might be truncated (if security bounds allow it, performance is critical and no pre-computation may be stored/cached): $\pi = h(w)$; also some additional salt and/or other information may be used on top of the input to the hash function.

Below the different values that may be used in the protocol are listed and described. Please note that not all values are always used.

TABLE 1

Static Values

| Value | Meaning |
|---|---|
| $\mathbb{G}$ | mathematical group |
| G, G' | two generators of $\mathbb{G}$ with unknown discrete logarithm |
| x, y | private keys of Alice and Bob |
| $X = x \cdot G$, $Y = y \cdot G$ | public keys of Alice and Bob |
| $\pi = h(w)$ | hashed password |
| $Q = \pi \cdot G$ | "public key" for password, but must kept secret |
| $G_\pi = G + \pi \cdot G'$ | password dependent generator, must kept secret |
| $Q_\pi = \pi \cdot G_\pi$ | password dependent "public key" for password, but must kept secret |
| Cert(X), Cert(Y) | certificates of public keys by trusted third party |
| $Cert_B(Q)$ | certificate of public key by Bob |

Sometimes these values are already stored (i.e., precomputed), and sometimes the values are re-computed. The general flow of the protocol is shown in Table 3.

TABLE 2

General Flow

| Alice: $\mathbb{G}$, G, . . . | Communication | Bob: $\mathbb{G}$, G, . . . |
|---|---|---|
| $r \in_R \mathbb{Z}_n$ compute ephemeral public key $R = r \cdot G$ | $R \rightarrow$ | $s \in_R \mathbb{Z}_n$ compute ephemeral public key $S = s \cdot G$ |
| | $\leftarrow S, cB$ | check $R \in \mathbb{G}$ compute (some) shared key(s) compute check value cB |
| check $S \in \mathbb{G}$ compute some shared key(s) compute the shared key check cB compute check value cA send first message | cA, AE(first message) $\rightarrow$ where AE is authenticated encryption | |
| | | (compute shared key) check cA receive first message |

Along with the general flow of Table 3, additional information might be sent along including:

Certificates if needed; but this may be skipped if the public key is already known; and Early messages (em); the security level of the em is limited compared to first message (fm).

Certificates may receive special treatment, because they would show the identity of the two players. There are in general three possible ways to get certificates:

Already known certificates are used;

From a trusted third party (TTP) (plain or over secure channel); and

From the other party (in plain or encrypted).

For security reasons, it should be kept in mind that the length of an encrypted certificate might still leak, such that privacy might not be as strong as expected. There are several ways to mitigate this:

Only use public keys instead of complete certificates in hand shake and get certificates from TTP over another secure channel, which might not be attacked or where the certificate may be hidden in other traffic;

Add a nonce to certificates to generate different lengths; maybe also restrict to a limited set of lengths to limit the number of different classes;

If the PKI allows, restrict certificates and certificate chains to a fixed length; and Also, a mix might be an option, where only the first link of a certificate chain is used directly in the hand shake (either with fixed length or extended with nonce) and the rest of the certificate chain is loaded from a TTP over another secure channel, which might not be attacked or where the certificate (chain) may be hidden in other traffic.

For encryption and computation of MACs, some key(s) are needed, which are derived from transferred and computed values (shared secrets). For efficiency a very simple key derivation is used but could of course also be replaced by something more complex: $k\|k'=h(Z)$ for a shared secret Z and keys k, k'. The assumption here is that the hash function generates as many bits as the encryption and MAC will need for their keys k and k' together. This assumption is normally given, e.g., with the combination of AES-128 and SHA-256. The security level of hash functions in general is considered half its output length (in bits) and the security level of an encryption scheme is normally equal to its key length (in bits). Of course, for unusual cases where this assumption does not hold, an extended key derivation may be used, e.g., $k\|k'=h(0x01,Z)\|h(0x02,Z)\| \ldots$ To obtain independent (session-)keys, the shared secret is updated with a so-called key refreshment (if desired). This may be done in a way that the derived keys and new shared secret are computationally independent: $k\|k'=h(0x01,Z)$, $Z=h(0x00,Z)$. Deriving a shared secret for each side may also be considered, and then only the secrets and the corresponding key(s) are updated per side to ease synchronization (additional derivation counters might also be useful in this context for re-synchronization).

To build the protocol there are several possibilities to choose from. The possible values that might be computed are explained in Table 4:

TABLE 3

| Ephemeral/Computed Values | |
|---|---|
| Value | Meaning |
| $r \in_R \mathbb{Z}_n$ | ephemeral secret key of Alice |
| $s \in_R \mathbb{Z}_n$ | ephemeral secret key of Bob |
| $R = r \cdot G$ or $R = r \cdot G_\pi$ | ephemeral (password dependent) public key of Alice |
| $S = s \cdot G$ or $S = s \cdot G_\pi$ | ephemeral (password dependent) public key of Bob |
| $Z' = r \cdot S = s \cdot R$ | ephemeral DH secret |
| $R' = r \cdot Y = y \cdot R$ | semi-static DH secret, computed by Bob as $R' = (y - s) \cdot R + Z'$ |
| $S' = s \cdot X = x \cdot S$ | semi-static DH secret, computed by Alice as $S' = (x - r) \cdot S + Z'$ |
| $\tilde{S} = s \cdot Q = \pi \cdot S$ or $\tilde{S} = s \cdot Q_\pi = \pi \cdot S$ | semi-static DH secret, computed by Alice as $\tilde{S} = (\pi - r) \cdot S + Z'$ |
| $U = (U_1, U_2) = h(R', R)$ | $1^{st}$ early key; only if Alice knows Bob's public key(s) |
| $V = (V_1, V_2) = h(Z', R, S)$ | $2^{nd}$ early key; always possible |
| $W = (W_1, W_2) = h(Z', R', R, S, Y)$ | $3^{rd}$ early key; |
| $Z = h(Z', R', S', \tilde{S}, R, S, X, Y)$ | shared secret; only values that are used/computed |
| $K = (K_1, K_2) = h(0x01, Z)$ | encryption and authentication key for secure channel |
| $Z = h(0x00, Z)$ | new shared secret |
| $AE_U(Cert(X), em)$ | early message and certificate of X if applicable |
| $AE_V(Cert(Y))$ | encrypted certificate of Y if applicable |
| $AE_W(em)$ | early message |
| $AE_K(em)$ | early message, before Alice has authenticated |
| $AE_W(Cert(X), \{id_Q|Cert_B(Q)\})$ | encrypted certificate of X and id or certificate of Q if applicable |
| $AE_K(fm)$ | first message, after Alice and Bob have authenticated |
| $cB = MAC_{W_2}(R, S)$ or $cB = MAC_{K_2}(0x05, R, S)$ | check value of Bob to authenticate and confirm key |
| $cA = MAC_{K_2}(0x03, R, S)$ | check value of Alice to authenticate and confirm key |

It is noted that the computation of R', S', S̃ already includes a countermeasure against multiple trace side channel attacks, such as DPA, because the secret keys or password are only used in an addition, which is easy to protect. One could even store the secret keys or password in a blinded way and refresh this blinding with each use.

With these building blocks handshake protocol variations for different use cases may be designed. The questions to consider when designing various handshake protocols may include:

How are the certificates handled?
Are certificates already known?
Who needs/wants to be authenticated?
How to authenticate: With PKI only, password only, or mixed?
For when a password is used:
  Is it ok, that Bob uses the password to authenticate to a third party?
  Is there only one user/password? Is it ok to lose anonymity?

First an embodiment using mutual authentication without password and unknown certificates is described in Table 5 below. It is noted that in the tables below, that items in [ ] are optional and may or may not be performed based upon the user's requirements.

TABLE 4

| Mutual Authentication without Password and unknown Certificates | | |
|---|---|---|
| Alice: $\mathbb{G}$, G, n, x, $X = x \cdot G$, Cert(X) | Communication | Bob: $\mathbb{G}$, G, n, y, $Y = y \cdot G$, Cert(Y) |
| $R \in_R \mathbb{Z}_n$ $R = r \cdot G$ | $R \rightarrow$ | $s \in_R \mathbb{Z}_n$ $S = s \cdot G$ Check $R \in \mathbb{G}$ $Z' = s \cdot R$ $R' = (y - s) \cdot R + Z'; (= y \cdot R)$ $V = h(Z', R, S)$ $W = h(Z', R', R, S, Y)$ $cB = MAC_{W_2}(R, S)$ |
| | $\leftarrow S, AE_V(Cert(Y)), cB,$ $[AE_W(em)]$ | |
| Check $S \in \mathbb{G}$ $Z' = r \cdot S$ $V = h(Z', R, S)$ Decrypt & check Cert(Y) $R' = r \cdot Y$ $W = h(Z', R', R, S, Y)$ Check cB $S' = (x - r) \cdot S + Z'; (= x \cdot S)$ $Z = h(Z', R', S', R, S, X, Y)$ $K = h(0x01, Z)$ $Z = h(0x00, Z)$ $cA = MAC_{K_2}(0x03, R, S)$ | $AE_W(Cert(X)), cA,$ $AE_K(fm) \rightarrow$ | |
| | | Decrypt & check Cert(X) $S' = s \cdot X$ $Z = h(Z', R', S', R, S, X, Y)$ $K = h(0x01, Z)$ $Z = h(0x00, Z)$ check cA |

In Table 5, Alice first generates a random number r which is multiplied with the generator G to produce R that is then sent to Bob. Bob likewise generates a random number s which is multiplied with the generator G to produce S. Bob then checks that $R \in \mathbb{G}$ and calculates various values Z', R', V, W, and cB. Bob sends the values S, $AE_V(Cert(Y))$, cB, and optionally [$AE_W(em)$] to Alice where $AE_V$ is an authenticated encryption using V as the key. Alice then checks that $S \in \mathbb{G}$ and calculates various values Z', R', V, W, R', Z, K, and cA as shown, as well as decrypting and checking Cert(Y) as well as checking cB. Alice then sends $AE_W(Cert(X))$, cA, and $AE_K(fm)$ to Bob. Bob then decrypts and checks Cert(X), calculates S', Z, and K, and checks cA. At this point Alice and Bob both have a shared secret Z and encryption and authentication key K for a secure channel.

The next embodiment includes mutual authentication without a password, but at least Alice already knows the certificate of Bob's public key or at least knows the key and has assurance of its authenticity. If Bob also knows Alice's public key certificate, the corresponding steps regarding this certificate may be skipped. Table 6 below described this embodiment.

TABLE 5

Mutual Authentication without Password and unknown Certificates

| Alice: $\mathbb{G}$, G, n, x, x, X = x · G, Cert(X), Y | Communication | Bob: $\mathbb{G}$, G, n, y, y, Y = y · G, Cert(Y) |
|---|---|---|
| $r \in_R \mathbb{Z}_n$<br>R = r · G<br>R' = r · S<br>[U = h(R', R)] | R, [$AE_U$([Cert(X), ](em)] → | $s \in_R \mathbb{Z}_n$<br>S = s · G |
| | ← S, cB[, $AE_K$(em)] | Check R ∈ $\mathbb{G}$<br>Z' = s · R<br>R' = (y − s) · R + Z'; (= y · R)<br>[U = h(R', r)]<br>[Decrypt & check Cert(X)]<br>S' = s · X<br>Z = h(Z', R', S', R, S, X, Y)<br>K = h(0x01, Z)<br>Z = h(0x00, Z)<br>cB = $MAC_{K_2}$(0x05, R, S) |
| Check S ∈ $\mathbb{G}$<br>Z' = r · S<br>V = h(Z', R, S)<br>S' = (x − r) · S + Z'; (= x · S)<br>Z = h(Z', R', S', R, S, X, Y)<br>K = h(0x01, Z)<br>Z = h(0x00, Z)<br>Check cB<br>cA = $MAC_{K_2}$(0x03, R, S) | cA, $AE_K$(fm) → | |
| | | check cA |

In the embodiment of Table 6 Bob receives Alice's certificate earlier in the process and hence is able to calculate various of the values earlier, and Alice does not need to check Bob's certificate.

An embodiment shown in Table 7 illustrates a typical client/server handshake, where only the server should be authenticated.

TABLE 6

One-sided Authentication without Password and unknown Certificates

| Alice: $\mathbb{G}$, G, n | Communication | Bob: $\mathbb{G}$, G, n, y, Y = y · G, Cert(Y) |
|---|---|---|
| $R \in_R \mathbb{Z}_n$<br>R = r · G | R → | $s \in_R \mathbb{Z}_n$<br>S = s · G |
| | ← S, $AE_V$(Cert(Y)), cB,<br>[$AE_W$(em)] | Check R ∈ $\mathbb{G}$<br>Z' = s · R<br>V = h(Z', R, S)<br>R' = (y − s) · R + Z'; (= y · R)<br>Z = h(Z', R', R, S, Y)<br>K = h(0x01, Z)<br>Z = h(0x00, Z)<br>cB = $MAC_{K_2}$(0x05, R, S) |
| Check S ∈ $\mathbb{G}$<br>Z' = r · S<br>V = h(Z', R, S)<br>Decrypt & check Cert(Y)<br>R' = r · Y<br>Z = h(Z', R', R, S, Y)<br>K = h(0x01, Z)<br>Z = h(0x00, Z)<br>Check cB<br>cA = $MAC_{K_2}$(0x03, R, S) | cA, $AE_K$(fm) → | |
| | | check cA |

In the embodiment of Table 7 only Bob's certificate is sent and checked and no certificate is exchanged or checked for Alice.

An embodiment shown in Table 8 illustrates a mutual authentication with PKI and password (only known by Alice; Bob will have all the password dependent public keys), assuming public keys are known on both sides.

TABLE 7

Asymmetric mixed mutual Authentication with PKI & Password and unknown certificates

| Alice: $\mathbb{G}$, G, n, [x, X, Cert(X)], π, {id$_Q$∣Cert$_B$(Q)} | Communication | Bob: $\mathbb{G}$, G, n, y, Y, Cert(Y)[, Q] |
|---|---|---|
| r ∈$_R$ $\mathbb{Z}_n$<br>R = r · G | R → | s ∈$_R$ $\mathbb{Z}_n$<br>S = s · G |
|  | ← S, AE$_W$(Cert(Y)), cB,<br>[AE$_W$(em)] | Check R ∈ $\mathbb{G}$<br>Z' = s · R<br>R' = (y − s) · R + Z'; (=y · R)<br>V = h(Z', R, S)<br>W = h(Z', R', R, S, Y)<br>cB = MAC$_{W_2}$ (R, S) |
| Check S ∈ $\mathbb{G}$<br>Z' = r · S<br>V = h(Z', R, S)<br>Decrypt & check Cert(Y)<br>R' = r · Y<br>W = h(Z', R', R, S, Y)<br>Check cB<br>[S' = (x − r) · S + Z'; (=x · S)<br>S̃ = (π − r) · S + Z'; (=π · S)<br>Z = h(Z', R', [S', ]S̃, R, S, X , Y)<br>K = h(0x01, Z)<br>Z = h(0x00, Z)<br>cA = MAC$_{K_2}$(0x03, R, S) | $AE_W\begin{pmatrix} [Cert(X),] \\ \{id_Q \mid Cert_B(Q)\} \end{pmatrix}$,<br><br>cA, AE$_K$(fm) → |  |
|  |  | [Decrypt & check Cert(X)]<br>[S' = s · X]<br>Decrypt & check {id$_Q$∣Cert$_B$(Q)}<br>S̃ = s · Q<br>Z = h(Z', R', [S', ]S̃, R, S, X , Y)<br>K = h(0x01, Z)<br>Z = h(0x00, Z)<br>check cA |

The embodiment of Table 8 very similar to the embodiment of Table 5, but Alice calculates a value S̃ and in her second communication sends $$AE_W\begin{pmatrix} [Cert(X),] \\ \{id_Q \mid Cert_B(Q)\} \end{pmatrix}$$

instead of AE$_W$(Cert(X)). As a result, Bob decrypts and checks {id$_Q$∣Cert$_B$(Q)} and then also calculates S̃. The value S̃ is used to calculate Z as well.

An embodiment shown in Table 9 illustrates an asymmetric mutual authentication with single password only.

TABLE 8

Asymmetric Mutual Authentication with single Password only

| Alice: $\mathbb{G}$, G, G', n, π, [, G$_π$] | Communication | Bob: $\mathbb{G}$, G, G', n, G$_π$, Q$_π$ |
|---|---|---|
| R ∈$_R$ $\mathbb{Z}_n$<br>R = r · G$_π$(= r · G + r · π · G') | R → | s ∈$_R$ $\mathbb{Z}_n$<br>R = s · G$_π$ |
|  | ← S, cB[, AE$_K$(em)] | Check R ∈ $\mathbb{G}$<br>Z' = s · R<br>S̃ = s · Q$_π$<br>Z = h(Z', S̃, R, S)<br>K = h(0x01, Z) |

TABLE 8-continued

Asymmetric Mutual Authentication with single Password only

| Alice: $\mathbb{G}$, G, G', n, $\pi$, [, $G_\pi$] | Communication | Bob: $\mathbb{G}$, G, G', n, $G_\pi$, $Q_\pi$ |
|---|---|---|
| | | $Z = h(0x00, Z)$ |
| | | $cB = MAC_{K_2}(0x05, R, S)$ |
| Check $S \in \mathbb{G}$ | cA, $AE_K(fm) \rightarrow$ | |
| $Z' = r \cdot S$ | | |
| $\tilde{S} = (\pi - r) \cdot S + Z'$ | | |
| $Z = h(Z', \tilde{S}, R, S)$ | | |
| $K = h(0x01, Z)$ | | |
| $Z = h(0x00, Z)$ | | |
| Check cB | | |
| $cA = MAC_{K_2}(0x03, R, S)$ | | |
| | | check cA |

The embodiment of Table 9 is streamlined compared to the embodiment of Table 5, because of the use of the password $\pi$ and $Q_\pi$. As a result, the decrypting and checking of certificates is not required resulting in fewer other calculations to obtain a shared secret Z and shared key K.

An embodiment shown in Table 10 illustrates a mutual authentication with single password only.

TABLE 9

Mutual Authentication with single Password only

| Alice: $\mathbb{G}$, G, G', n, $\{\pi|G_\pi\}$ | Communication | Bob: $\mathbb{G}$, G, G', n, $\{\pi|G_\pi\}$ |
|---|---|---|
| $R \in_R \mathbb{Z}_n$ | $R \rightarrow$ | $s \in_R \mathbb{Z}_n$ |
| $R = r \cdot G_\pi(= r \cdot G + r \cdot \pi \cdot G')$ | | $R = s \cdot G_\pi(= s \cdot G + s \cdot \pi \cdot G')$ |
| | $\leftarrow$ S, cB[, $AE_K(em)$] | Check $R \in \mathbb{G}$ |
| | | $Z' = s \cdot R$ |
| | | $Z = h(Z', R, S, )$ |
| | | $K = h(0x01, Z)$ |
| | | $Z = h(0x00, Z)$ |
| | | $cB = MAC_{K_2}(0x05, R, S)$ |
| Check $S \in \mathbb{G}$ | cA, $AE_K(fm) \rightarrow$ | |
| $Z' = r \cdot S$ | | |
| $Z = h(Z', R, S,)$ | | |
| $K = h(0x01, Z)$ | | |
| $Z = h(0x00, Z)$ | | |
| Check cB | | |
| $cA = MAC_{K_2}(0x03, R, S)$ | | |
| | | check cA |

The embodiment of Table 10 is similar to the embodiment of Table 9, because both Alice and Bob have $\{\pi|G_\pi\}$ the calculations are simplified because the value $\tilde{S}$ is not calculated. As a result, the decrypting and checking of certificates is not required resulting in fewer other calculations to obtain a shared secret Z and shared key K.

For efficient implementations of the various described embodiments, the multiplications may be optimized for example by using pre-computation for the comb-method (for the same "bases").

Some further items should be noted regarding security. First, it should be mentioned that all these variants are based on a DH key exchange and hence have forward secrecy.

Regarding anonymity the general statement holds that the party that authenticates first is anonymous only against passive attackers excluding the special single-password embodiment (which will be discussed later). The party that authenticates second stays anonymous also against active attackers. In the single-password embodiment both honest parties know the identity that corresponds to the password, but no active attacker can make more than one guess for the password per protocol run and hence get knowledge about the identity This is interesting for example in passport access protocols, where the (identity of a) passport should not be trackable for attackers that get contactless access to the passport (or the terminal).

Forward deniability is also given, because everyone could simulate the random guesses of r and s and then compute the other values based on the public available values, except for the password embodiments, where no public values regarding the password are available. In this embodiment at least each of the two parties could do a full simulation with values they have seen at some point in time; for CertB(Q) for example that means that Bob might have stored this certificate when he generated it and hence also knows Q, which he would need to generate $\tilde{S}$. That means at least one of the two parties must have taken place in the communication, but not necessary the second party, which might be sufficient in cases where a password is used.

FIG. 1 illustrates an exemplary hardware diagram 100 for implementing a key exchange protocol according to the embodiments described above. As shown, the device 100 includes a processor 120, memory 130, user interface 140, network interface 150, and storage 160 interconnected via one or more system buses 110. It will be understood that FIG. 1 constitutes, in some respects, an abstraction and that the actual organization of the components of the device 100 may be more complex than illustrated.

The processor 120 may be any hardware device capable of executing instructions stored in memory 130 or storage 160 or otherwise processing data. As such, the processor may include a microprocessor, field programmable gate array (FPGA), application-specific integrated circuit (ASIC), or other similar devices.

The memory 130 may include various memories such as, for example L1, L2, or L3 cache or system memory. As such, the memory 130 may include static random-access memory (SRAM), dynamic RAM (DRAM), flash memory, read only memory (ROM), or other similar memory devices.

The user interface 140 may include one or more devices for enabling communication with a user such as an administrator. For example, the user interface 140 may include a display, a mouse, and a keyboard for receiving user commands. In some embodiments, the user interface 140 may include a command line interface or graphical user interface that may be presented to a remote terminal via the network interface 150. In some embodiments, no user interface may be present.

The network interface 150 may include one or more devices for enabling communication with other hardware devices. For example, the network interface 150 may include a network interface card (NIC) configured to communicate according to the Ethernet protocol. Additionally, the network interface 150 may implement a TCP/IP stack for communication according to the TCP/IP protocols. Various alternative or additional hardware or configurations for the network interface 150 will be apparent.

The storage 160 may include one or more machine-readable storage media such as read-only memory (ROM), random-access memory (RAM), magnetic disk storage media, optical storage media, flash-memory devices, or similar storage media. In various embodiments, the storage 160 may store instructions for execution by the processor 120 or data upon with the processor 120 may operate. For example, the storage 160 may store a base operating system 161 for controlling various basic operations of the hardware 100. Further, software for the handshake protocol function 162, may be stored in the memory. This software may implement the various embodiments described above.

It will be apparent that various information described as stored in the storage 160 may be additionally or alternatively stored in the memory 130. In this respect, the memory 130 may also be considered to constitute a "storage device" and the storage 160 may be considered a "memory." Various other arrangements will be apparent. Further, the memory 130 and storage 160 may both be considered to be "non-transitory machine-readable media." As used herein, the term "non-transitory" will be understood to exclude transitory signals but to include all forms of storage, including both volatile and non-volatile memories.

While the host device 100 is shown as including one of each described component, the various components may be duplicated in various embodiments. For example, the processor 120 may include multiple microprocessors that are configured to independently execute the methods described herein or are configured to perform steps or subroutines of the methods described herein such that the multiple processors cooperate to achieve the functionality described herein. Further, where the device 100 is implemented in a cloud computing system, the various hardware components may belong to separate physical systems. For example, the processor 120 may include a first processor in a first server and a second processor in a second server.

The embodiments described in FIG. 1 may also be implemented completely in hardware, completely in software such as described in FIG. 1, or a combination of both hardware and software.

The various embodiments described above provide a practical solution to the issue of key exchange between two parties. The parties may be individuals, machines, companies, etc. The embodiments provide various features regarding security based upon the specific use and level of knowledge that each party has of the other party. Further, the embodiments reduce the number of calculations required for the handshake protocol that improves the speed of operation of the protocol. The various calculations when performed by processing hardware allows for the secure sharing of information between two parties while resisting attacks from hostile third parties.

Any combination of specific software running on a processor to implement the embodiments of the invention, constitute a specific dedicated machine.

As used herein, the term "non-transitory machine-readable storage medium" will be understood to exclude a transitory propagation signal but to include all forms of volatile and non-volatile memory.

It should be appreciated by those skilled in the art that any block diagrams herein represent conceptual views of illustrative circuitry embodying the principles of the invention.

Although the various exemplary embodiments have been described in detail with particular reference to certain exemplary aspects thereof, it should be understood that the invention is capable of other embodiments and its details are capable of modifications in various obvious respects. As is readily apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A method of generating a shared secret by a first party A between the first party A and a second party B, comprising:

randomly generating an ephemeral private key $r \in \mathbb{Z}_n$, where n is the size of a group $\mathbb{G}$;

computing an ephemeral public key $R = r \cdot G$ based upon the ephemeral private key r and a generator G of the group $\mathbb{G}$;

transmitting to the second party the ephemeral public key R;

receiving from the second party an ephemeral public key S and a check value cB, wherein the check value cB is based upon an ephemeral private key s, the corresponding ephemeral public key $S = s \cdot G$ and the ephemeral public key R;

checking that the ephemeral public key S is an element of the group $\mathbb{G}$;

computing an ephemeral shared secret $Z' = r \cdot S$ based upon the ephemeral private key r and the ephemeral public key S;

computing a shared secret Z based upon the ephemeral shared secret Z', the ephemeral public key R and the ephemeral public key S;

computing a key K based upon the shared secret Z;

computing a new value for the shared secret Z based upon a one-way function applied to the shared secret Z;

checking the check value cB;

computing a second check value cA based upon the ephemeral public key R, the ephemeral public key S and the key K; and sending the second check value cA and an encrypted first message using the key K to the second party.

2. The method of claim 1, further comprising:
computing a semi-static shared secret R'=r·Y based upon the ephemeral private key r and the second party's public key Y; and
wherein the check value cB is based upon an ephemeral private key s, the corresponding ephemeral public key S and the ephemeral public key R as well as the second party's public key Y=y·G and the second party's private key y; and
wherein computing the shared secret Z based upon the ephemeral shared secret Z', the ephemeral public key R and the ephemeral public key S is further based upon the semi-static shared secret R' and the second party's public key Y.

3. The method of claim 2 wherein:
computing the shared secret Z based upon the ephemeral shared secret Z', the ephemeral public key R, the ephemeral public key S, the semi-static shared secret R' and the second party's public key Y is done by hashing the ephemeral shared secret Z', the semi-static shared secret R', the ephemeral public key R, the ephemeral public key S and the second party's public key Y;
computing a key K based upon the shared secret Z is done by hashing a first constant value followed by the shared secret Z;
computing a new value for the shared secret Z based upon the shared secret Z is done by hashing a second constant value followed by the shared secret Z; and
computing a second check value cA based upon the ephemeral public key R, the ephemeral public key S and the key K is done by computing a MAC over a third constant value, the ephemeral public key R, the ephemeral public key S using the key K.

4. The method of claim 2, further comprising:
computing a semi-static shared secret S' based upon the first party's private key x and the ephemeral public key S by computing S'=(x−r)·S+Z'; and
wherein the check value cB is based upon an ephemeral private key s, the corresponding ephemeral public key S, the ephemeral public key R, the second party's public key Y and the second party's private key y as well as the first party's public key X; and
wherein computing the shared secret Z based upon the ephemeral shared secret Z', the ephemeral public key R, the ephemeral public key S, the semi-static shared secret R' and the second party's public key Y is further based upon the semi-static shared secret S' and the first party's public key X.

5. The method of claim 4 wherein:
computing the shared secret Z based upon the ephemeral shared secret Z', the ephemeral public key R, the ephemeral public key S, the semi-static shared secret R', the second party's public key Y, the semi-static shared secret S' and the first party's public key X is done by hashing the ephemeral shared secret Z', the semi-static shared secret R', the semi-static shared secret S', the ephemeral public key R, the ephemeral public key S, the first party's public key X and the second party's public key Y;
computing a key K based upon the shared secret Z is done by hashing a first constant value followed by the shared secret Z;
computing a new value for the shared secret Z based upon the shared secret Z is done by hashing a second constant value followed by the shared secret Z; and
computing a second check value cA based upon the ephemeral public key R, the ephemeral public key S and the key K is done by computing a MAC over a third constant value, the ephemeral public key R, the ephemeral public key S using the key K.

6. The method of claim 2, further comprising:
computing a key W based upon the shared secret Z', the semi-static shared secret R', the ephemeral public key R, the ephemeral public key S and the second party's public key Y;
computing a semi-static shared secret $\tilde{S}=\pi \cdot S$ based upon a value $\pi \in \mathbb{Z}_n$, that depends on a password w of the first party, and the ephemeral public key S by computing $\tilde{S}=(\pi−r) \cdot S+Z'$;
encrypting an identifier id_Q for the password's public key Q=π·G or encrypting a certificate $Cert_B(Q)$ for the password's public key Q issued by the second party B, using the key W; and
sending the encrypted identifier id_Q or the encrypted certificate $Cert_B(Q)$ to the second party;
wherein the check value cB is based upon the key W, the ephemeral public key R and the ephemeral public key S, and
wherein computing the shared secret Z based upon the ephemeral shared secret Z', the ephemeral public key R, the ephemeral public key S, the semi-static shared secret R' and the second party's public key Y is further based upon the semi-static shared secret $\tilde{S}$.

7. The method of claim 6 wherein:
computing a key W based upon the shared secret Z', the semi-static shared secret R', the ephemeral public key R, the ephemeral public key S and the second party's public key Y is done by hashing the shared secret Z', the semi-static shared secret R', the ephemeral public key R, the ephemeral public key S and the second party's public key Y; and
computing the shared secret Z based upon the ephemeral shared secret Z', the ephemeral public key R, the ephemeral public key S, the semi-static shared secret R', the second party's public key Y and the semi-static shared secret $\tilde{S}$ is done by hashing the ephemeral shared secret Z', the semi-static shared secret R', the semi-static shared secret $\tilde{S}$, the ephemeral public key R, the ephemeral public key S and the second party's public key Y;
computing a key K based upon the shared secret Z is done by hashing a first constant value followed by the shared secret Z;
computing a new value for the shared secret Z based upon the shared secret Z is done by hashing a second constant value followed by the shared secret Z; and
computing a second check value cA based upon the ephemeral public key R, the ephemeral public key S and the key K is done by computing a MAC over a third constant value, the ephemeral public key R, the ephemeral public key S using the key K.

8. The method of claim 1, wherein the generator G is replaced by a password dependent generator $G_\pi=G+\pi \cdot G'$ where the value $\pi \in \mathbb{Z}_n$ depends on a password w and G' is another generator of the group $\mathbb{G}$.

9. The method of claim 8 wherein:
computing a shared secret Z based upon the ephemeral shared secret Z', the ephemeral public key R and the ephemeral public key S is done by hashing the ephemeral shared secret Z', the ephemeral public key R and the ephemeral public key S;

computing a key K based upon the shared secret Z is done by hashing a first constant value followed by the shared secret Z;

computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

10. The method of claim 8, further comprising:

computing a semi-static shared secret $\tilde{S}$ based upon the value π and the ephemeral public key S by computing $\tilde{S}=(\pi-r)\cdot S+Z'$; and wherein computing the shared secret Z based upon the ephemeral shared secret Z', the ephemeral public key R and the ephemeral public key S is further based upon the semi-static shared secret $\tilde{S}$.

11. The method of claim 10 wherein:

computing the shared secret Z based upon the ephemeral shared secret Z', the ephemeral public key R, the ephemeral public key S and the semi-static shared secret $\tilde{S}$ is done by hashing the ephemeral shared secret Z', the ephemeral public key R, the ephemeral public key S and the semi-static shared secret $\tilde{S}$;

computing a key K based upon the shared secret Z is done by hashing a first constant value followed by the shared secret Z;

computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

12. The method of claim 1 wherein:

computing a shared secret Z based upon the ephemeral shared secret Z', the ephemeral public key R and the ephemeral public key S is done by hashing the ephemeral shared secret Z', the ephemeral public key R and the ephemeral public key S;

computing a key K based upon the shared secret Z is done by hashing a first constant value followed by the shared secret Z;

computing a new value for the shared secret Z based upon the shared secret Z is done by hashing a second constant value followed by the shared secret Z; and computing a second check value cA based upon the ephemeral public key R, the ephemeral public key S and the key K is done by computing a MAC over a third constant value, the ephemeral public key R, the ephemeral public key S using the key K.

13. A method of generating a shared secret by a second party B between a first party A and the second party B, comprising:

randomly generating an ephemeral private key $s \in \mathbb{Z}_n$, where n is the size of a group $\mathbb{G}$;

computing an ephemeral public key $S=s\cdot G$ based upon the ephemeral private key s and a generator G of the group $\mathbb{G}$;

receiving from the first party an ephemeral public key R;

checking that the ephemeral public key R is an element of the group $\mathbb{G}$;

computing an ephemeral shared secret $Z'=s\cdot R$ based upon the ephemeral private key s and the ephemeral public key R;

computing a shared secret Z based upon the ephemeral shared secret Z', the ephemeral public key R and the ephemeral public key S;

computing a key K based upon the shared secret Z;

computing a new value for the shared secret Z based upon a one-way function applied to the shared secret Z;

compute a check value cB based upon the key K, the ephemeral public key R and the ephemeral public key S;

sending to the first party the ephemeral public key S and the check value cB;

receiving a second check value cA and an encrypted first message from the first party, wherein the check value cA is based upon the key K, the ephemeral public key R and the ephemeral public key S and the first message is encrypted using the key K; and checking the check value cA.

14. The method of claim 13 further comprising:

computing a semi-static shared secret R' based upon the second party's private key y and the ephemeral public key R by computing $R'=(y-s)\cdot R+Z'$; and wherein computing the shared secret Z based upon the ephemeral shared secret Z', the ephemeral public key R and the ephemeral public key S is further based upon the semi-static shared secret R' and the second party's public key Y.

15. The method of claim 14 further comprising:

computing a semi-static shared secret $S'=s\cdot X$ based upon the ephemeral private key s and the first party's public key X; and wherein computing the shared secret Z based upon the ephemeral shared secret Z', the ephemeral public key R, the ephemeral public key S, the semi-static shared secret R' and the second party's public key Y is further based upon the semi-static shared secret S' and the first party's public key X.

16. The method of claim 14 wherein:

computing the shared secret Z based upon the ephemeral shared secret Z', the ephemeral public key R, the ephemeral public key S, the semi-static shared secret R', the second party's public key Y, the semi-static shared secret S' and the first party's public key X is done by hashing the ephemeral shared secret Z', the semi-static shared secret R', the semi-static shared secret S', the ephemeral public key R, the ephemeral public key S, the first party's public key X and the second party's public key Y;

computing a key K based upon the shared secret Z is done by hashing a first constant value followed by the shared secret Z;

computing a new value for the shared secret Z based upon the shared secret Z is done by hashing a second constant value followed by the shared secret Z; and compute a check value cB based upon the key K, the ephemeral public key R and the ephemeral public key S is done by computing a MAC over a third constant value, the ephemeral public key R, the ephemeral public key S using the key K.

17. The method of claim 14 further comprising:
computing a key W based upon the shared secret Z', the semi-static shared secret R', the ephemeral public key R, the ephemeral public key S and the second party's public key Y;
receiving from the first party an encrypted identifier id_Q or an encrypted certificate $Cert_B(Q)$, issued by the second party B, wherein $Q=\pi \cdot G$ is the password's public key and $\pi \in \mathbb{Z}_n$ is a value, that depends on the first party's password w;
decrypting the identifier id_Q or the certificate $Cert_B(Q)$ using the key W and obtain the valid password's public key Q;
computing a semi-static shared secret $\tilde{S}=s \cdot Q$ based upon the ephemeral private key s and the password's public key Q; and
wherein compute a check value cB based upon the key K, the ephemeral public key R and the ephemeral public key S is based upon the key W instead of the key K; and
wherein computing the shared secret Z based upon the ephemeral shared secret Z', the ephemeral public key R, the ephemeral public key S, the semi-static shared secret R' and the second party's public key Y is further based upon the semi-static shared secret $\tilde{S}$.

18. The method of claim 11 wherein:
computing a key W based upon the shared secret Z', the semi-static shared secret R', the ephemeral public key R, the ephemeral public key S and the second party's public key Y is done by hashing the shared secret Z', the semi-static shared secret R', the ephemeral public key R, the ephemeral public key S and the second party's public key Y;
computing the shared secret Z based upon the ephemeral shared secret Z', the ephemeral public key R, the ephemeral public key S, the semi-static shared secret R', the second party's public key Y and the semi-static shared secret $\tilde{S}$ is done by hashing the ephemeral shared secret Z', the semi-static shared secret R', the semi-static shared secret $\tilde{S}$, the ephemeral public key R, the ephemeral public key S and the second party's public key Y;
computing a key K based upon the shared secret Z is done by hashing a first constant value followed by the shared secret Z;
computing a new value for the shared secret Z based upon the shared secret Z is done by hashing a second constant value followed by the shared secret Z; and
compute a check value cB based upon the key W, the ephemeral public key R and the ephemeral public key S is done by computing a MAC over a third constant value, the ephemeral public key R, the ephemeral public key S using the key W.

19. The method of claim 13 wherein the generator G is replaced by a password dependent generator $G_\pi = G + \pi \cdot G'$ where the value $\pi \in \mathbb{Z}_n$ depends on a password w and G' is another generator of the group $\mathbb{G}$.

20. The method of claim 19 wherein:
computing a shared secret Z based upon the ephemeral shared secret Z', the ephemeral public key R and the ephemeral public key S is done by hashing the ephemeral shared secret Z', the ephemeral public key R and the ephemeral public key S;

computing a key K based upon the shared secret Z is done by hashing a first constant value followed by the shared secret Z;
computing a new value for the shared secret Z based upon the shared secret Z is done by hashing a second constant value followed by the shared secret Z; and
compute a check value cB based upon the key K, the ephemeral public key R and the ephemeral public key S is done by computing a MAC over a third constant value, the ephemeral public key R, the ephemeral public key S using the key K.

21. The method of claim 16 further comprising:
computing a semi-static shared secret $\tilde{S}=s \cdot Q_\pi$ based upon the ephemeral private key s and the password's public key $Q_\pi = \pi \cdot G_\pi$; and
wherein computing the shared secret Z based upon the ephemeral shared secret Z', the ephemeral public key R and the ephemeral public key S is further based upon the semi-static shared secret $\tilde{S}$.

22. The method of claim 19 wherein:
computing the shared secret Z based upon the ephemeral shared secret Z', the ephemeral public key R, the ephemeral public key S and the semi-static shared secret $\tilde{S}$ is done by hashing the ephemeral shared secret Z', the semi-static shared secret $\tilde{S}$, the ephemeral public key R, the ephemeral public key S;
computing a key K based upon the shared secret Z is done by hashing a first constant value followed by the shared secret Z;
computing a new value for the shared secret Z based upon the shared secret Z is done by hashing a second constant value followed by the shared secret Z; and
compute a check value cB based upon the key K, the ephemeral public key R and the ephemeral public key S is done by computing a MAC over a third constant value, the ephemeral public key R, the ephemeral public key S using the key K.

23. The method of claim 13 wherein:
computing a shared secret Z based upon the ephemeral shared secret Z', the ephemeral public key R and the ephemeral public key S is done by hashing the ephemeral shared secret Z', the ephemeral public key R and the ephemeral public key S;
computing a key K based upon the shared secret Z is done by hashing a first constant value followed by the shared secret Z;
computing a new value for the shared secret Z based upon the shared secret Z is done by hashing a second constant value followed by the shared secret Z; and
compute a check value cB based upon the key K, the ephemeral public key R and the ephemeral public key S is done by computing a MAC over a third constant value, the ephemeral public key R, the ephemeral public key S using the key K.

24. The method of claim 14 wherein:
computing the shared secret Z based upon the ephemeral shared secret Z', the ephemeral public key R, the ephemeral public key S, the semi-static shared secret R' and the second party's public key Y is done by hashing the ephemeral shared secret Z', the semi-static shared secret R', the ephemeral public key R, the ephemeral public key S and the second party's public key Y;
computing a key K based upon the shared secret Z is done by hashing a first constant value followed by the shared secret Z;

computing a new value for the shared secret Z based upon the shared secret Z is done by hashing a first constant value followed by the shared secret Z; and compute a check value cB based upon the key K, the ephemeral public key R and the ephemeral public key S is done by computing a MAC over a third constant value, the ephemeral public key R, the ephemeral public key S using the key K.

* * * * *